(12) United States Patent
Simcox-Ayres

(10) Patent No.: US 12,740,625 B2
(45) Date of Patent: Sep. 22, 2026

(54) MOBILE DEVICE CARRYING DEVICE

(71) Applicant: Crane Collective LLC, New York, NY (US)

(72) Inventor: Katherine Simcox-Ayres, New York, NY (US)

( * ) Notice: Subject to any disclaimer, the term of this patent is extended or adjusted under 35 U.S.C. 154(b) by 223 days.

(21) Appl. No.: 18/367,493

(22) Filed: Sep. 13, 2023

(65) Prior Publication Data

US 2024/0081498 A1 Mar. 14, 2024

Related U.S. Application Data

(60) Provisional application No. 63/405,986, filed on Sep. 13, 2022.

(51) Int. Cl.
*A45C 11/00* (2006.01)
*A45F 5/00* (2006.01)
*H04B 1/3888* (2015.01)

(52) U.S. Cl.
CPC ................ *A45C 11/00* (2013.01); *A45F 5/00* (2013.01); *H04B 1/3888* (2013.01); *A45C 11/002* (2025.01); *A45F 2005/008* (2013.01)

(58) Field of Classification Search
CPC ..................................................... A45C 11/00
See application file for complete search history.

(56) References Cited

U.S. PATENT DOCUMENTS 1,419,644 A * 6/1922 Recker .................... F16G 15/02 174/138 B
2,684,065 A * 7/1954 Umbenhower ........... A61F 5/50 128/880
2,857,454 A * 10/1958 Bahr ...................... H01H 17/08 174/138 B
3,104,650 A * 9/1963 Grahling .............. A01K 27/005 119/770
3,727,657 A * 4/1973 Landis ................... A45C 1/024 150/120
5,411,445 A * 5/1995 Oda .......................... F16G 9/00 474/154
7,067,755 B1 * 6/2006 Schoal, Jr. ............ H01H 17/08 200/329

(Continued)

FOREIGN PATENT DOCUMENTS

JP 3245781 U * 2/2024

OTHER PUBLICATIONS

Aporia—MagSafe Clear Case with Pearl Wristlet Strap | Compatible for MagSafe iPhone 13 Pro | Strap Lanyard for Strong Wireless Charging Luxury Design (iPhone 13 Pro), Aug. 1, 2022, https://www.amazon.com/Aporia-Wristlet-Compatible-Wireless-Charging/dp/B0B8BT98HM?th=1 (Year: 2022).*

*Primary Examiner* — Patrick F Marinelli
(74) *Attorney, Agent, or Firm* — Losey PLLC

(57) ABSTRACT

Mobile device carrying devices may comprise structures including one or more connecting points configured to engage with a mobile device carrying case, a strap, and connecting ends of such strap configured to engage with the connecting points affixed to the mobile device carrying case. Connecting points may comprise a shoulder configured to engage with the interior surface of a mobile device case, a shaft extending from the shoulder and passing from the interior to the exterior of the mobile device case, and a connection interface configured to engage an external structure.

8 Claims, 12 Drawing Sheets

(56) References Cited

U.S. PATENT DOCUMENTS

| | | | | |
|---|---|---|---|---|
| 10,211,875 | B1 * | 2/2019 | Glass, Jr. | A45C 11/00 |
| 11,771,581 | B1 * | 10/2023 | Mansuripur | A61F 5/048 602/22 |
| 2003/0180088 | A1 * | 9/2003 | Camevali | F16M 11/14 403/56 |
| 2009/0290296 | A1 * | 11/2009 | Stiehl | H04M 1/04 361/679.01 |
| 2010/0018015 | A1 * | 1/2010 | Moore | A45F 5/00 24/586.11 |
| 2015/0201742 | A1 * | 7/2015 | Tomko | A45C 13/28 224/219 |
| 2024/0081498 | A1 * | 3/2024 | Simcox-Ayres | A45F 5/00 |
| 2024/0245177 | A1 * | 7/2024 | Drake | A45C 11/00 |

* cited by examiner

100

MOBILE DEVICE CARRYING DEVICE

RELATED APPLICATIONS

This application claims the benefit of Provisional Application No. 63/405,986, filed Sep. 13, 2022, the entirety of which is incorporated herein by reference.

FIELD OF THE DISCLOSURE

The present disclosure is directed to mobile device accessories. In particular, the present disclosure is directed to devices for carrying mobile phones and other mobile devices.

BACKGROUND OF THE DISCLOSURE

Mobile phone usage is common in society. Many mobile phone users utilize cases for their mobile phones. Many other mobile devices, such as tablet computers, are also popular items and users may utilize cases for these devices.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, or structurally similar elements.

DETAILED DESCRIPTION

Mobile phone usage is nearly ubiquitous in modern society. Mobile phone users may utilize phone cases. Phone cases broadly consist of a class of accessories which are configured to attach to, enclose, support, or otherwise hold a mobile phone. Phone cases may provide a way for a user to customize the appearance of their mobile phone. Phone cases may also be configured to protect a mobile phone from dents, scratches, or other damages due to impacts, drops, or contact with other objects. Phone cases may further provide additional features, such as kickstands, wallets or cardholders, external batteries, or integration with external accessories such as keyboards.

Exemplary types of phone cases include pouches or sleeves, holsters, shells, skins, fitted cases, flip cases, and wallet cases. Cases known as shells or skins refer to structures configured to enclose the back (i.e., the side of phone opposite the screen) and sides of the mobile phone while the mobile phone is placed within the case. The surfaces of these cases that contact the mobile phone may be referred to as "inner surfaces" and the opposite surfaces of these cases which are exposed to the world may be referred to as "outer surfaces." In some implementations of phone cases, the screen of the mobile phone is uncovered, allowing the user to easily view and manipulate the mobile phone screen. In some implementations of phone cases, additional structures may be provided which cover or protect the screen of the mobile phone, such as screen protector films or plastic covers. In some implementations of phone cases, these screen protecting features may be integrated with the rest of the case, while in others the screen protecting features may be separate structures.

While phone cases may provide many features, consumers may desire phone accessories that enable a user to carry or transport the phone hands-free. Consumers may also desire these accessories to have additional, customizable, ornamental, or fashion features. Further, many other mobile devices, such as tablet computers, may also utilize cases similar in structure and function to those described above. Users may also desire to carry or transport such devices hands-free. While the present disclosure utilizes mobile phone cases as exemplary implementations, the principles and structures disclosed herein are not limited solely to phones and may be applicable to a wide variety of mobile electronic devices and their corresponding cases.

Figure 1:
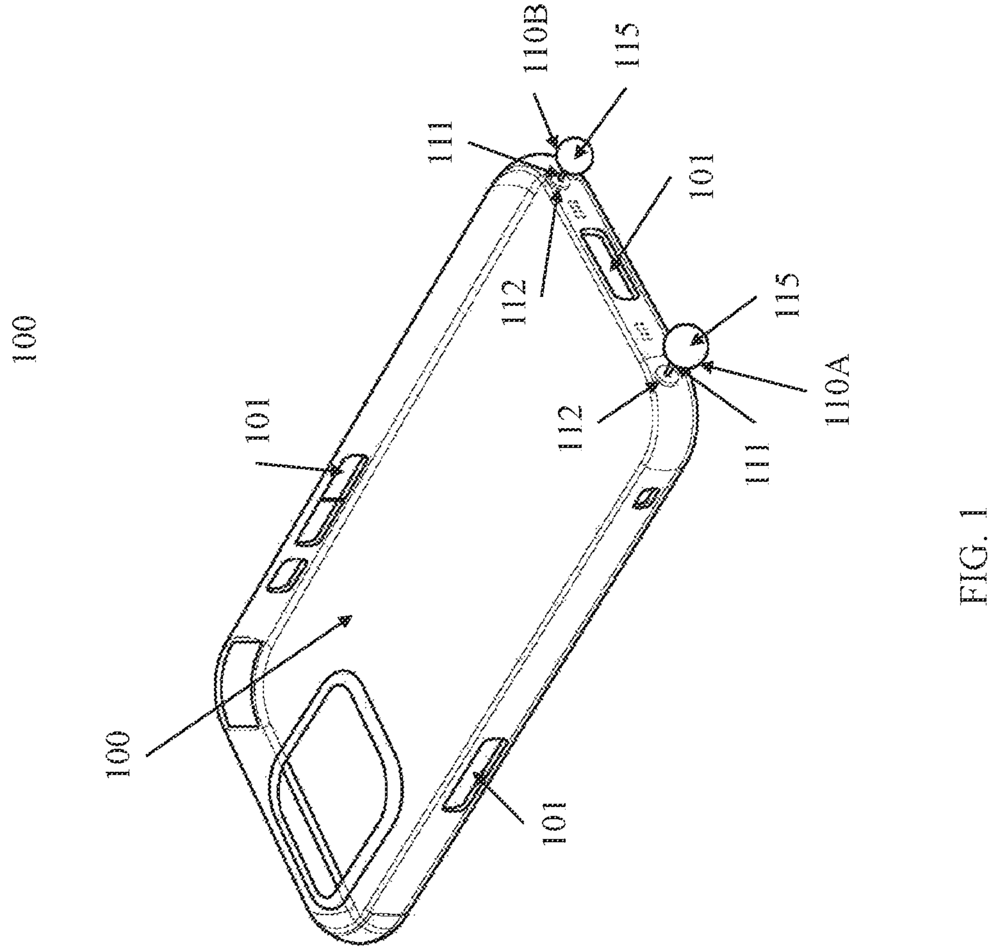
FIG. 1 is a perspective view of an implementation of a mobile device carrying device.

FIG. 1 is a perspective view of an implementation of a mobile device carrying device.

In some implementations, a mobile device carrying device comprises a mobile phone case 100. Phone case 100 may comprise any type of structure configured to hold a mobile phone, such as a pouch, sleeve, holster, shell, skin, fitted case, flip case, wallet case, or the like.

In some implementations, phone case 100 comprises a shell or skin style case. In some implementations, phone case 100 may comprise a structure that encloses the back (i.e., the side of the phone opposite the screen) and sides of the mobile phone, while leaving the screen accessible to the user. In some implementations, phone case 100 may comprise a structure that encloses the back and sides of the mobile phone and additionally comprises a portion which in a first position covers the screen of the mobile phone, that can be moved or adjusted to a second position (for example, by folding along one edge of the structure, by magnetic adhesion between the screen cover structure and the remainder of the case, by rotating or swiveling about a fastening point between the case and the adjustable portion, or otherwise) where the screen is not covered to permit a user to interact with the screen.

Phone case 100 may be manufactured from any suitable material. For example, phone case 100 may be manufactured from a plastic (such as high-density polyethylene, polyethylene, polycarbonate, polypropylene, polystyrene, polyurethane, acrylonitrile butadiene styrene, polylactic acid, or the like), rubber, silicone, metal (such as steel, aluminum, brass, or the like), leather, cloth, wood, composite material (such as fiberglass, carbon fiber, or the like), or any combination of materials. In some implementations, phone case 100 may be manufactured from multiple materials, where a first material comprises a first part of the phone case, a second material comprises a second part of the phone case, a third material comprises a third part of the phone case, and so forth. In some implementations, phone case 100 may be manufactured of a material, or materials, configured to protect the mobile phone from damage due to impacts, scratches, drops, dents, or other contact.

Phone case 100 may be configured in dimensions to accommodate a variety of mobile phones. In some implementations, phone case 100 may be configured to accommodate an Apple iPhone, Samsung Galaxy phone, Google Pixel phone, or any other type or model of commercially available mobile phone.

In some implementations, phone case 100 may further comprise one or more access ports 101. Access ports 101 may comprise gaps or openings which pass through the structure of phone case 100. In some implementations, access ports 101 are configured so that certain features of the mobile phone are accessible through the structure of phone case 100. For example, phone case 100 may comprise access ports 101 that permit the user to manipulate buttons on the side or rear of the mobile phone while the phone is within phone case 100, or access ports 101 may be configured to leave a speaker, microphone, or camera element of the mobile phone uncovered when the phone is within phone case 100.

In some implementations, a phone carrying device comprises a first connecting point 110A. in some implementations, first connecting point 110A may comprise a structure or series of structures configured to permit the connection of a strap or similar carrying apparatus to phone case 100, as more particularly described herein.

In some implementations, first connecting point 110A may comprise a shaft 111. Shaft 111 may comprise a structure with a first distal end and a second distal end opposite the first distal end. In some implementations, shaft 111 may comprise a substantially linear structure, i.e., having a curvature that deviates a small degree from linear. In some implementations, shaft 111 may comprise a curved structure, i.e., having a curvature that deviates a large degree from linear. In some implementations, shaft 111 may comprise a structure combining two or more portions having different orientations, for example where a first linear portion of shaft 111 is oriented in a first direction and a second linear portion of shaft 111 is oriented in a second direction, where the second direction is perpendicular to the first direction (though in some implementations the second direction may be any direction other than parallel to the first direction). In some implementations, shaft 111 may comprise portions which are linear, curved, or both, at varying orientations.

Shaft 111 may have any desirable cross-sectional profile. In some implementations, shaft 111 comprises a circular cross-sectional profile (i.e., shaft 111 comprises a cylinder). In some implementations (not shown in FIG. 1), shaft 111 comprises a square or rectangular cross-sectional profile (i.e., shaft 111 comprises a rectangular prism). In some implementations (not shown in FIG. 1), shaft 111 may comprise a triangular, pentagonal, hexagonal, heptagonal, octagonal, or other polygonal cross-sectional profile (i.e., shaft 111 comprises a corresponding polygonal prism). In some implementations (not shown in FIG. 1), shaft 111 may comprise a non-polygonal or complex cross-sectional profile, such as an oval, s-curve, hourglass, or z-curve.

In some implementations (not shown in FIG. 1), shaft 111 may comprise two or more distinct portions comprising distinct cross-sectional profiles. For example, in some implementations (not shown in FIG. 1) shaft 111 may comprise a first portion comprising a circular cross-sectional profile (i.e., a cylinder) and a second portion comprising an octagonal cross-sectional profile (i.e., an octagonal prism). In some implementations (not shown in FIG. 1), the transition between portions may be abrupt. In other implementations, the transition between portions may be blended, i.e., where the cross-sectional profile of the first portion is gradually altered to the cross-sectional profile of the second portion in a smooth or curved fashion.

In some implementations, first connecting point 110A may comprise a shoulder 112. In some implementations, shoulder 112 is secured to the first distal end of shaft 111. Shoulder 112 may comprise a structure configured to engage an inner surface of phone case 100. In some implementations, shoulder 112 may be configured such that shaft 111 can pass through an access port 101 in phone case 100, but shoulder 112 is of dimensions where shoulder 112 cannot pass through access port 101 but instead engages with the inner surface of phone case 100. In such implementations, shoulder 112 prevents movement of shaft 111 and any objects attached thereto away from phone case 100.

Shoulder 112 may comprise any shape suitable or desirable to engage with the inner surface of phone case 100. In some implementations, shoulder 112 may comprise a polygonal prism, such as a rectangular, trapezoidal, triangular, hexagonal, or other polygonal prism. In some implementations, shoulder 112 may comprise a non-polygonal prism. In some implementations, shoulder 112 may comprise a cylinder. In some implementations, shoulder 112 may comprise a sphere. In some implementations, shoulder 112 may comprise a complex shape. In some implementations, shoulder 112 may be configured with a low thickness, i.e., when a first side of shoulder 112 is engaged with the inner surface of phone case 100, a second side of shoulder 112 opposite the first side is minimally displaced from the first side of shoulder 112. In such implementations, this small displacement of shoulder 112 is configured such that the presence of shoulder 112 within the interior of phone case 100 does not impede the placement and storage of a mobile phone within phone case 100. In some implementations, shoulder 112 may be configured to reduce or eliminate the contact of shoulder 112 and a mobile phone when shoulder 112 and the mobile phone are both placed within phone case 100.

In some implementations, first connecting point 110A further comprises a connection interface 115. Connection interface 115 may comprise a structure configured to mate with one or more external structures. In some implementations, connection interface 115 may mate with an external structure by being inserted into the external structure. In some implementations, connection interface 115 may mate with an external structure by receiving a portion of the external structure. In some implementations, connection interface 115 may mate with an external structure through other means, such as magnetic attraction or adhesion between connection interface 115 and the external structure.

In some implementations, such as the implementation shown in FIG. 1, connection interface 115 comprises a ball mount. In some implementations, connection interface 115 comprises a spherical structure. In some implementations, connection interface 115 comprises a substantially spherical structure, i.e., a structure where most but not all points on its surface are the same distance from the center point of the structure. In some implementations, connection interface 115 is located at the second distal end of shaft 111.

In some implementations, a phone carrying device comprises a second connecting point 110B. In some implementations, second connecting point 110B may comprise the same structures and features of the first connecting point, such as shaft 111, shoulder 112, and connection interface 115, wherein such structures serve substantially similar purposes. In some implementations, first connecting point 110A and second connecting point 110B are structurally identical. In some implementations, first connecting point 110A and second connecting point 110B are not structurally identical.

In some implementations, a phone carrying device comprises first and second connecting points that are located on the same face of phone case 100. In some implementations, both first connecting point 110A and second connecting point 110B are located on the bottom face of phone case 100, where the bottom face of phone case 100 is the face corresponding to the bottom of the mobile phone when the mobile phone is placed within phone case 100 and held in its normal upright orientation. In some implementations, first connecting point 110A and second connecting point 110B are located at opposite lateral ends of the bottom face of phone case 100. In some implementations, first connecting point 110A is displaced a fixed distance in a first direction away from the centerline of the face of phone case 100 on which first connecting point 110A is located, and second connecting point 110B is displaced a fixed distance in a second direction away from the centerline of the same face of phone case 100 as first connecting point 110A, but where the second direction is opposite the first direction. In some implementations, the fixed distances by which first connecting point 110A and second connecting point 110B are displaced from the centerline of the face of phone case 100 on which they are located is the same. In other implementations, these fixed distances may be different.

In some implementations, first connecting point 110A and second connecting point 110B may be located on different faces of phone case 100. In some implementations, first connecting point 110A may be located on a first face of phone case 100, and second connecting point 110B may be located on a second face of phone case 100. In some implementations, the first and second faces are opposite each other, for example opposing lateral sides of phone case 100.

Figure 2:
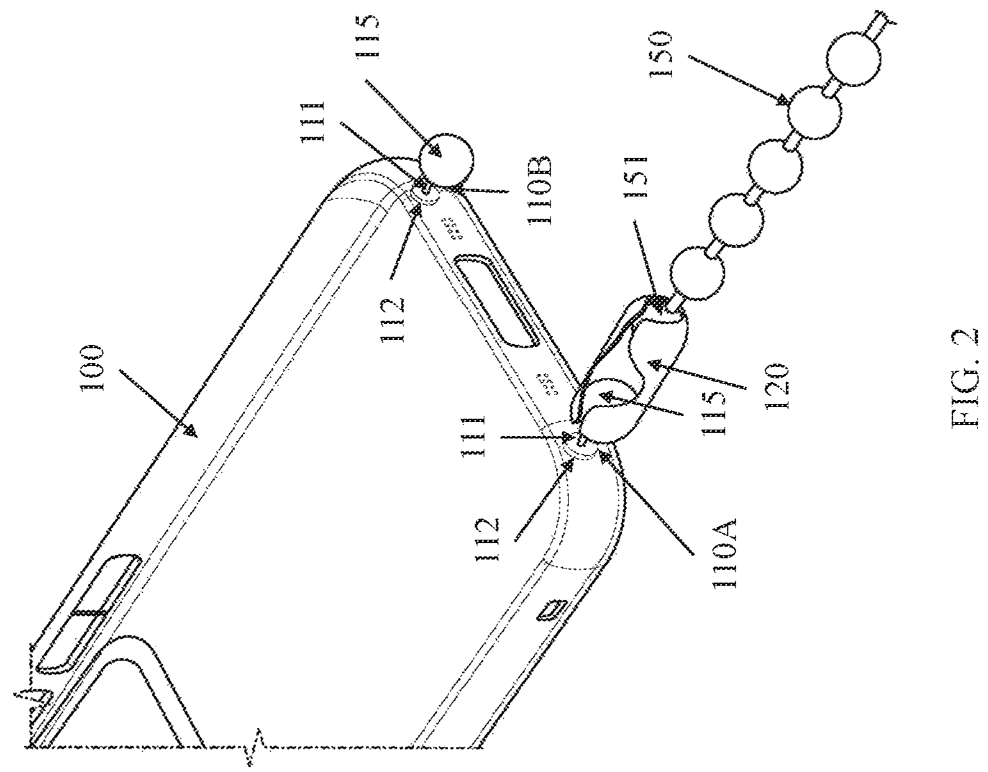
FIG. 2 is a perspective view of an implementation of a mobile device carrying device.

FIG. 2 is a perspective view of an implementation of a mobile device carrying device.

In some implementations, a phone carrying device comprises an intermediary connector 120. Intermediary connector 120 may comprise a structure configured to connect or mate with connection interface 115 and/or a first connecting end 151 (described further below) and/or a second connecting end 152 (described further below) of a strap 150 (described further below). In some implementations, intermediary connector 120 comprises a ball chain connector. In such implementations, intermediary connector 120 may comprise a structure configured to connect one or more ball mounts or ball chain structures to each other. In some implementations, intermediary connector 120 may comprise a three-dimensional structure of fixed length with a first distal end and a second distal end opposite the first distal end. In some implementations, intermediary connector 120 comprises an opening (i.e., a hole or unenclosed portion of the structure) in one or more of its longitudinal faces configured for a ball structure of a ball mount to pass through. In some implementations, intermediary connector 120 comprises an opening of varying dimensions, such that a structure, such as a ball mount, may pass through a first part of the opening but not through a second part of the opening.

In some implementations, the opening comprises its largest dimensions at the longitudinal center of intermediary connector 120, and the opening comprises a small dimension at or near the first distal end. In some implementations, the opening comprises its largest dimensions at the longitudinal center of intermediary connector 120, and the opening comprises a small dimension at or near the second distal end. In some implementations, the opening comprises its largest dimensions at the longitudinal center of intermediary connector 120, and the opening comprises a small dimension at or near the first distal end and the second distal end. In some implementations, the dimensions of the opening at the first and second distal ends are identical. In some implementations, the dimensions of the opening at the first and second distal ends are not identical but are both smaller than the largest dimension of the opening.

In some implementations, intermediary connector 120 is of dimensions such that a connection interface 115 may pass through the opening in intermediary connector 120 at its largest dimension, where the largest dimension is located at the longitudinal center of intermediary connector 120, but cannot pass through the opening in intermediary connector 120 at one or both of the first or second distal end of intermediary connector 120. In some implementations, the opening of intermediary connector 120 is of dimensions such that a shaft 111 affixed to connection interface 115 may pass through the opening of intermediary connector 120 at one or both of the first or second distal end of intermediary connector 120. In this arrangement, intermediary connector 120 may be considered mated to shaft 111 and connection interface 115. This mated arrangement may prevent the movement of intermediary connector 120 away from shaft 111 and connection interface 115 and may be used to secure one or more features attached to intermediary connector 120 to shaft 111 and connection interface 115, and thereby to structures to which such elements are already affixed.

In some implementations, when shaft 111 affixed to connection interface 115 is mated with intermediary connector 120 in this manner, shaft 111 extends outward from the first distal end (or second distal end, as applicable) of intermediary connector 120 in the same longitudinal direction as intermediary connector 120 (i.e., intermediary connector 120 and shaft 111 are parallel). In some implementations, when shaft 111 affixed to connection interface 115 is mated with intermediary connector 120 in this manner, shaft 111 extends outward from the first distal end (or second distal end, as applicable) of intermediary connector 120 in the same longitudinal direction as intermediary connector 120 (i.e., intermediary connector 120 and shaft 111 are parallel) and further share a common centerline. In some implementations, intermediary connector 120 may be configured with the ability to rotate about connection interface 115 such that the centerline of intermediary connector 120 may be oriented in a direction which is not parallel to shaft 111. In some implementations, intermediary connector 120 may comprise additional structures enabling it to be fixed in a particular orientation with respect to shaft 111 and connection interface 115.

In some implementations, intermediary connector 120 may be configured to mate with the connection interface 115 of first connecting point 110A. In some implementations, intermediary connector 120 may be configured to mate with the connection interface 115 of second connecting point 110B.

In some implementations, intermediary connector 120 comprises a cylindrical structure. In some implementations, intermediary connector 120 comprises a prism structure, such as a rectangular, trapezoidal, hexagonal, triangular, or other polygonal or non-polygonal prism. In some implementations, intermediary connector 120 comprises a complex, curved, or wavy profile.

Figure 3:
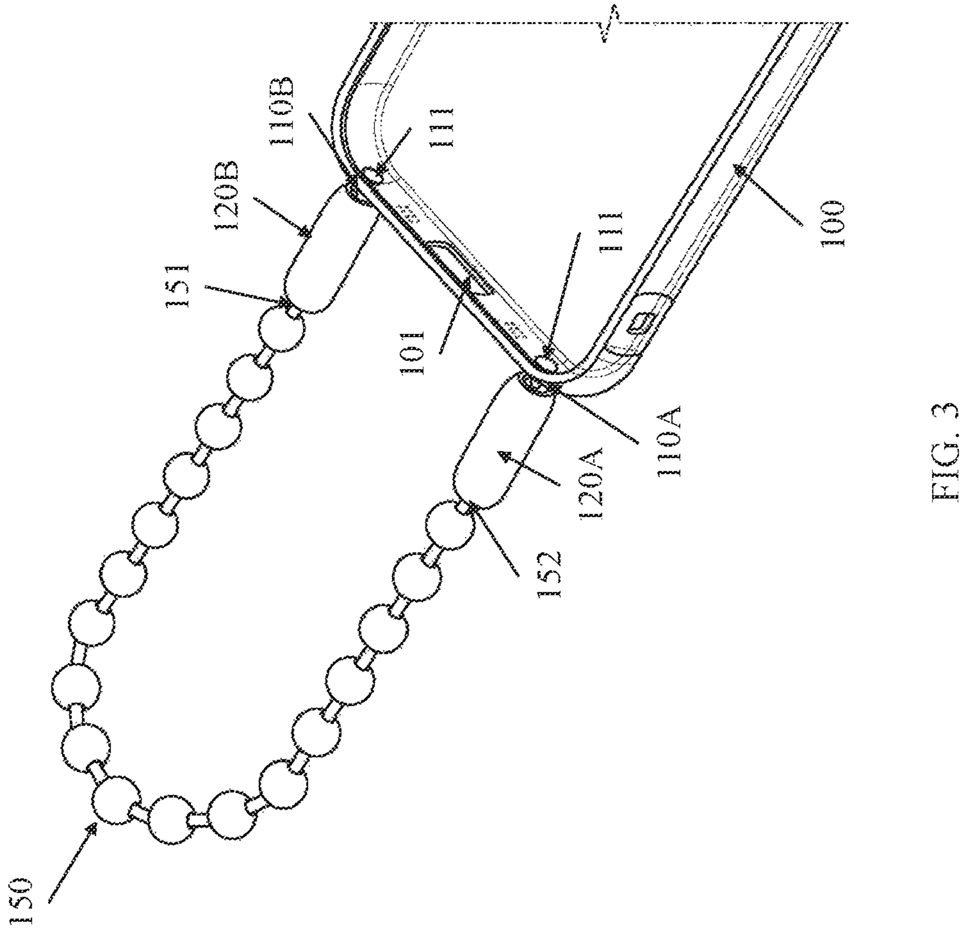
FIG. 3 is a perspective view of an implementation of a mobile device carrying device.

FIG. 3 is a perspective view of an implementation of a mobile device carrying device.

In some implementations, a phone carrying device comprises a strap 150. Strap 150 may comprise a structure of fixed length intended to fasten, secure, or carry an object or to hold onto an object. In some implementations, strap 150 may comprise an elongated flap or ribbon of material. In some implementations, strap 150 may comprise a rope, cord, string, wire, or similar element. In some implementations, strap 150 may comprise a chain or chain-like structure wherein multiple identical or substantially identical structures are interlinked in a recurring manner. In some implementations, strap 150 may comprise a repeating series of identical or substantially identical structures which affix to each other in a sequential manner through hooks, interlocking structures, or the like. In some implementations, strap 150 may comprise a ball chain. In some implementations, strap 150 may comprise beading, knotwork, or other ornamental elements.

In some implementations, strap 150 may comprise a first connecting end 151. First connecting end 151 may comprise a structure affixed to a first end of strap 150 configured to connect the first end of strap 150 to an external structure, i.e., to mate strap 150 with an external structure. In some implementations, first connecting end 151 may comprise a structure identical to connection interface 115 (not shown). In some implementations, first connecting end 151 may comprise a ball mount. In some implementations, first connecting end 151 may comprise a hook, snap, loop, button, or other fastening structure.

In some implementations, strap 150 may comprise a second connecting end 152. Second connecting end 152 may comprise a structure affixed to a second end of strap 150 configured to connect the second end of strap 150 to an external structure, i.e., to mate strap 150 with an external structure. In some implementations, second connecting end 152 may comprise a structure identical to connection interface 115. In some implementations, the first and second end of strap 150 are opposing (i.e., they lie at the opposite extremes along a dimension of strap 150). In some implementations, second connecting end 152 may comprise a ball mount. In some implementations, second connecting end 152 may comprise a hook, snap, loop, button, or other fastener. In some implementations, first connecting end 151 and second connecting end 152 of strap 150 may be configured to connect or mate with an intermediary connector 120. In other implementations, first connecting end 151 and second connecting end 152 may be configured to connect or mate with a connection interface 115.

In the implementation shown in FIG. 3, a phone carrying device comprises a phone case 100. Phone case 100 comprises a first connecting point 110A and second connecting point 110B. A first intermediary connector 120A is mated with first connecting point 110A. A second intermediary connector 120B is mated with second connecting point 110B. First intermediary connector 120A and second intermediary connector 120B comprise ball chain connectors.

In the implementation shown in FIG. 3, strap 150 comprises a beaded string of fixed length. First connecting end 151 of strap 150 is mated with first intermediary connector 120A. Second connecting end 152 of strap 150 is mated with second intermediary connector 120B.

When all structures are mated as described, strap 150 is affixed to phone case 100. A user can then carry phone case 100 and the phone contained therein with strap 150. For example, a user may drape strap 150 across his or her shoulder and allow phone case 100 and the phone inside to hang from the user's shoulder by way of strap 150. In some implementations, a user may pass strap 150 through a belt loop prior to affixing strap 150 to phone case 100, thereby securing phone case 100 and the mobile phone to the user's waist. In some implementations, a user may wrap strap 150 around his or her wrist or arm to allow phone case 100 and the phone inside to hang from the user's wrist or arm. In some implementations, a user may hold strap 150 in his or her hand and allow phone case and the phone inside to hang from this held position. In some implementations, the length of strap 150 may be optimized for a particular carrying method (i.e., a short strap for carrying as a wristlet or a long strap for draping over a shoulder). In some implementations, strap 150 may be configured with additional structures (not shown) enabling the user to lengthen or shorten the strap.

Figure 4A:
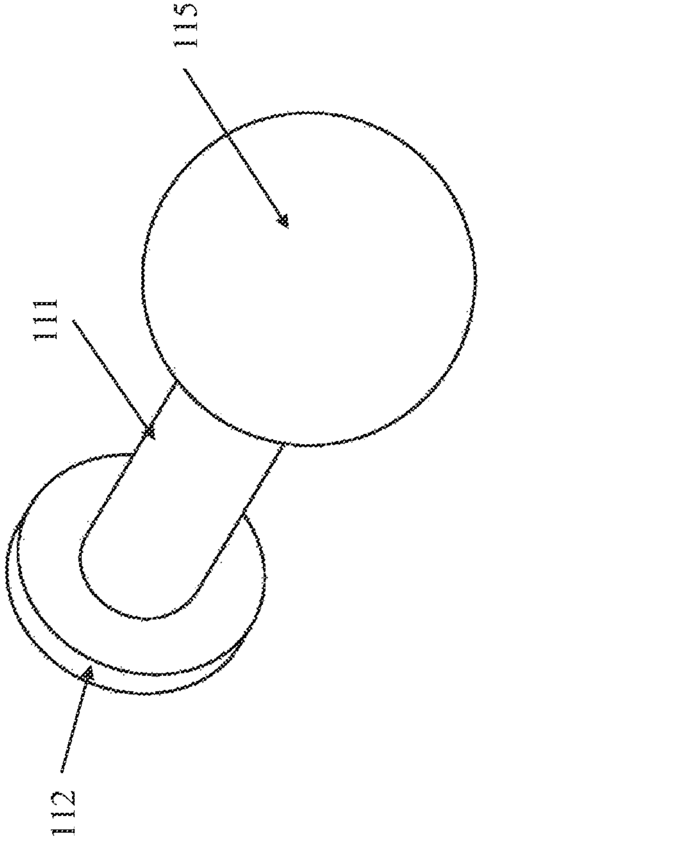
FIG. 4A is a profile view of an implementation of a connecting point.

FIG. 4A is a profile view of an implementation of a connecting point.

In the implementation shown, shoulder 112 is affixed to a first distal end of shaft 111, and connection interface 115 is affixed to a second distal end of shaft 111 opposite the first. In the implementation shown in FIG. 4A, connection interface 115 comprises a ball mount. In some implementations, these three elements may be fabricated together as a single piece. In some implementations, shoulder 112 may be configured to pass through an access port 101 (not shown) under certain conditions (i.e., at a specific angle) and to engage with the inner face of phone case 100 (not shown) once passed through access port 101 (not shown). Once engaged in this manner, shoulder 112 may prevent the movement of the combined shoulder 112, shaft 111, and connection interface 115 away from phone case 100.

Figure 4B:
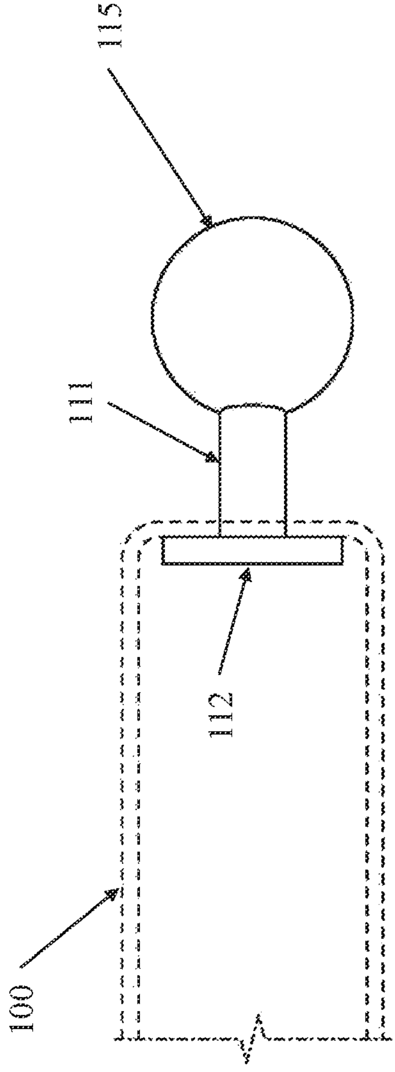
FIG. 4B is a profile view of an implementation of a mobile device carrying device.

FIG. 4B is a profile view of an implementation of a mobile device carrying device.

In the implementation shown in FIG. 4B, a shoulder of a connecting point has been passed through an access port 101 (not shown) in phone case 100. As shown in the figure, shoulder 112 engages with the inner face of phone case 100. Shaft 111 is connected at a first distal end to shoulder 112, and passes through phone case 100 via an access port. Shaft 111 is connected to connection interface 115 at a second distal end opposite the first.

Figure 5A:
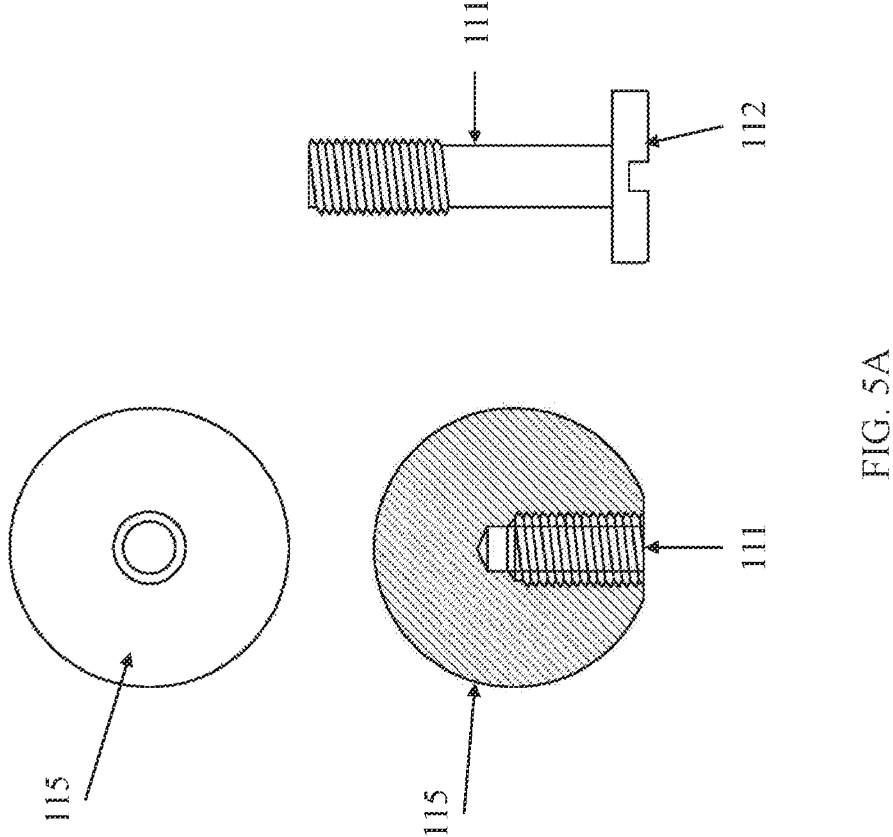
FIG. 5A is a partial view of an implementation of a connecting point.

FIG. 5A is a partial view of an implementation of a connecting point.

In some implementations, shaft 111 comprises a first portion comprising a threaded screw structure and a second portion comprising a non-threaded structure. In some implementations, the portion of shaft 111 comprising a non-threaded structure extends from the distal end of shaft 111 which engages shoulder 112. In some implementations, the portion of shaft 111 comprising a threaded structure extends from the distal end of shaft 111 opposite the end which engages shoulder 112 (i.e., the threaded structure is located on the end intended to engage connection interface 115). In some implementations, the threaded and non-threaded portions are of equal length. In some implementations, the threaded portion is longer than the non-threaded portion. In some implementations, the non-threaded portion is longer than the threaded portion.

In some implementations, connection interface 115 comprises a threaded hole or void. In some implementations, the threaded hole is configured to receive a portion of shaft 111 comprising a threaded screw structure. By rotating connection interface 115, shaft 111, or both, some or all of the threaded portion of shaft 111 may be mated with the corresponding threads in the hole in connection interface 115, thereby securing shaft 111 to connection interface 115. In some implementations, the length of the threaded portion of shaft 111 is equal to the depth of the threaded hole in connection interface 115.

In some implementations, shoulder 112 may comprise a threaded hole or void. In some implementations, the threaded hole or void is configured to receive a portion of shaft 111 comprising a threaded screw structure. In some implementations, some or all of the threaded portion of shaft 111 may be mated with the corresponding threads in the hole in shoulder 112. In some implementations, shoulder 112 may have a recess within the face of shoulder 112 opposite the face of shoulder 112 which adjoins shaft 111, where this recess is configured to receive a screwdriver or similar tool to aid in the rotation of shoulder 112 and/or shaft 111.

Figure 5B:
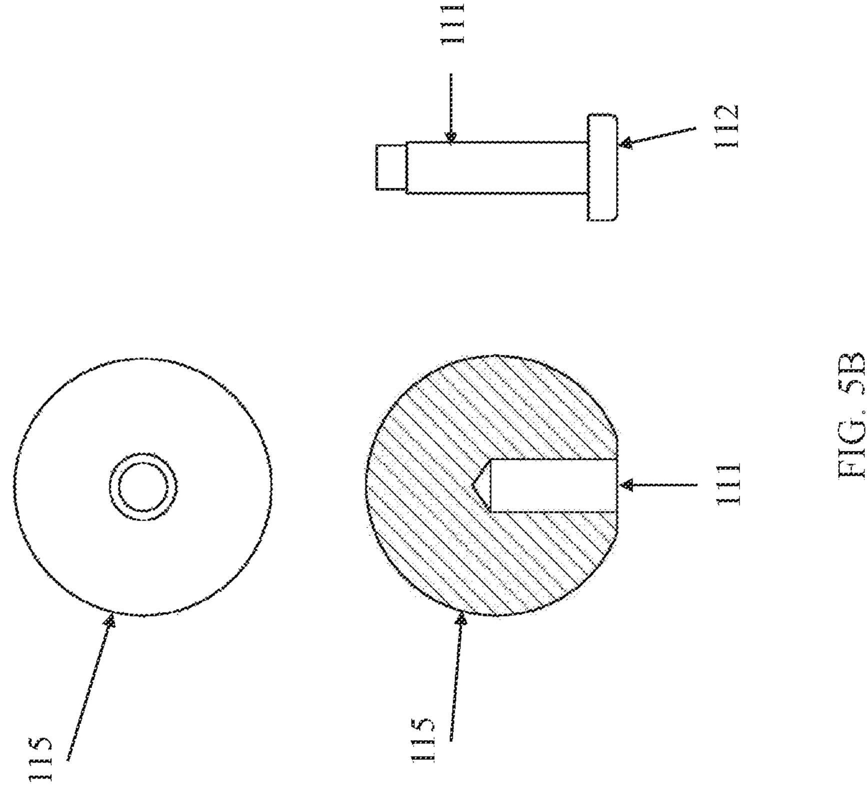
FIG. 5B is a partial view of an implementation of a connecting point.

FIG. 5B is a partial view of an implementation of a connecting point.

In some implementations, shaft 111 may comprise a first portion with a first diameter and a second portion with a second diameter, where the second diameter is smaller than the first diameter. In some implementations, connection interface 115 may comprise a hole or void. In some implementations, connection interface 115 may comprise a hole or void configured to one or more of the first or second diameters of shaft 111. In some implementations, shaft 111 may be inserted wholly or in part into the hole in connection interface 115, and then the two components may be pressed together by a die press or similar machine, thereby securing shaft 111 to connection interface 115.

Figure 6A:
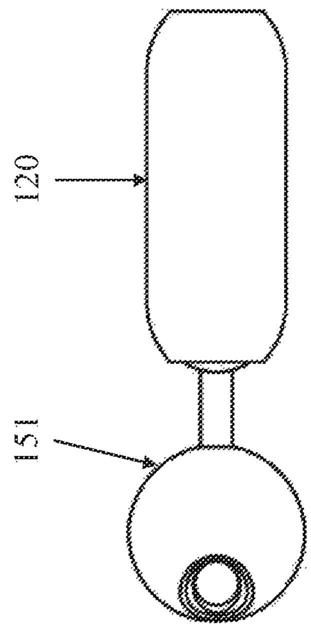
FIG. 6A is a side view of an implementation of a connecting end of a strap.

FIG. 6A is a side view of an implementation of a connecting end of a strap.

In some implementations, a connecting end may be manufactured as a single element with strap 150 (not shown). In some implementations, a connecting end may comprise a separate element capable of being affixed or connected to strap 150 (not shown). In some implementations, such as the implementation shown in FIG. 6A, a connecting end may comprise a structure capable of mating with an intermediary connector 120. In some implementations, this structure comprises a ball mount and intermediary connector comprises a ball chain connector. In some implementations, this structure is configured to mate with connection interface 115 (not shown) of connecting point 110 (not shown). A connecting end may further comprise a structure configured to mate with or connect to strap 150 (not shown). In some implementations, such as the implementation shown in FIG. 6A, a connecting end may comprise a spherical or substantially spherical element opposite the element configured to engage with intermediary connector 120 or with connecting point 110A (not shown) or 110B (not shown). In some implementations, this element may further comprise a hole or void passing through part of the element. In some implementations, a portion of strap 150 (not shown) may pass through the hole in the connecting end element, thereby connecting strap 150 (not shown) to the connecting element. This may be accomplished by passing the strap through the hole and preventing an end of the strap from passing through the hole by use of a knot, endcap, or similar structure which prevents passage through the opening. This may also be accomplished by passing the strap through opening such that the strap extends away from the connecting end element from both sides of the opening.

Figure 6B:
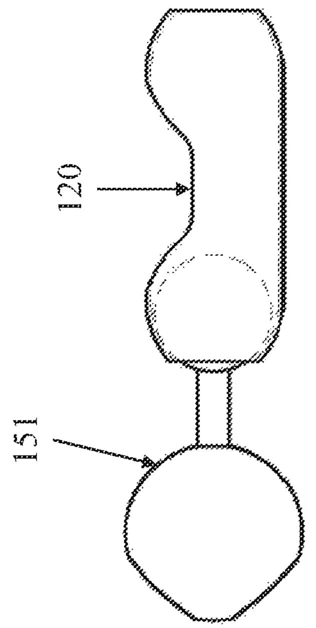
FIG. 6B is a side view of an implementation of a connecting end of a strap.

FIG. 6B is a side view of an implementation of a connecting end of a strap.

In FIG. 6B, it can be seen how the connecting end 151 mates with an intermediary connector 120. In the implementation shown, connecting end 151 comprises a ball mount configured to mate with intermediary connector 120, which comprises a ball chain connector.

Figure 6C:
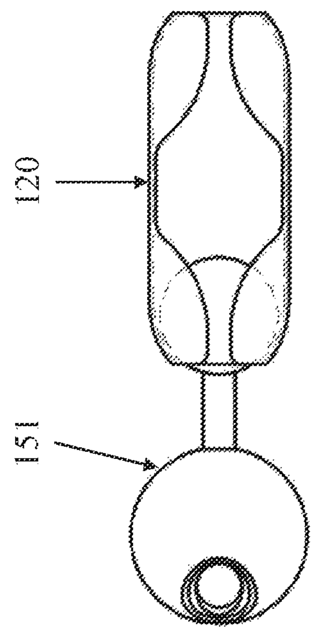
FIG. 6C is a side view of an implementation of a connecting end of a strap.

FIG. 6C is a side view of an implementation of a connecting end of a strap.

In FIG. 6C, it can be seen how the connecting end 151 mates with an intermediary connector 120. In the implementation shown, connecting end 151 comprises a ball mount configured to mate with intermediary connector 120, which comprises a ball chain connector.

Figure 7A:
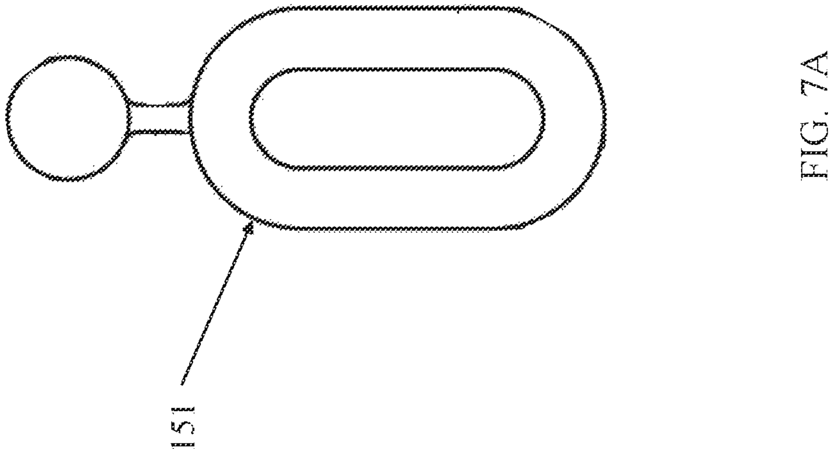
FIG. 7A is a side view of an implementation of a connecting end of a strap.

FIG. 7A is a side view of an implementation of a connecting end of a strap.

In some implementations, a connecting end 151 may comprise a circular or ovaloid structure. This structure may further comprise an element configured to mate with intermediary connector 120 (not shown) and/or connection interface 115 (not shown) on one end, which may be referred to as the "engaging element." In some implementations, a shaft may extend from one end of the circular or ovaloid structure to permit the engaging element to be offset from the rest of the structure. In some implementations, the engaging element is configured to be capable of mating with a ball chain connector.

Figure 7B:
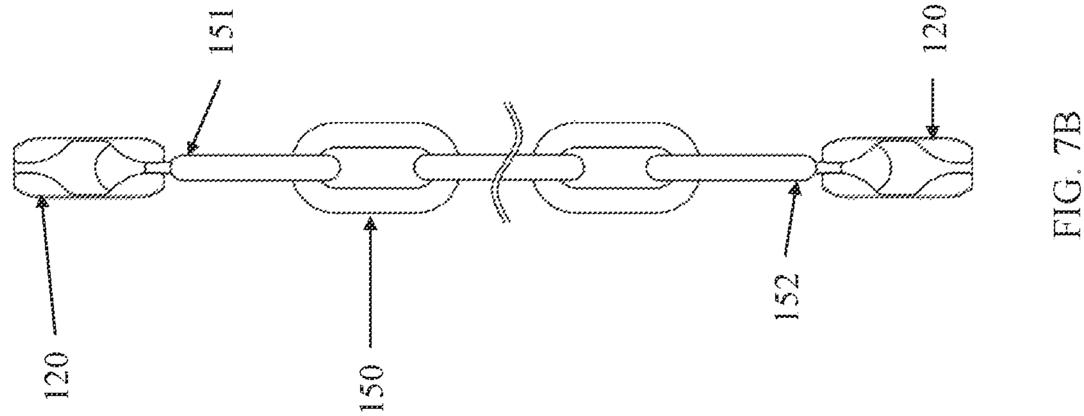
FIG. 7B is a side view of an implementation of a strap, connecting ends, and intermediary connectors.

FIG. 7B is a side view of an implementation of a strap, connecting ends, and intermediary connectors.

In some implementations, strap 150 comprises a series of circular or ovaloid elements linked together in a chain formation. In some implementations, a first chain link may be linked to a first connecting end 151, and a second chain link and the opposing end of strap 150 may be linked to a second connecting end 152. First connecting end 151 and second connecting end 152 may be further configured to mate with intermediary connectors 120.

The implementations described herein are not exclusive and certain variations thereof may be obvious to those skilled in the art. For example, one or more of the first connecting end and second connecting end of a strap may be manufactured as a single element or structure. In some implementations, the first connecting end and/or the second connecting end may be configured with an engaging element enabling such connecting end to mate directly with a connection interface of a connecting point. For example, a strap may have one or both connecting ends comprising a ball chain connector, such that the use of a separate ball chain connector or intermediary connector is not required, and the strap may be affixed directly to the ball mounts of the first and second connecting points affixed to the phone case. In some implementations, the shafts of a connecting point may pass through their own dedicated access ports of a phone case. In some implementations, the shafts of a connecting point may pass through phone case coextensive with access ports configured to permit access to a speaker, microphone, charging port, button, or other element of the mobile phone. In some implementations, an intermediary connector may have a first end configured to mate with a first element, and a second end configured to connect to a strap via a different, second type of element. In some implementations, an intermediary connector may have a first end configured to mate with a first element, and a second end configured to connect to a strap via a different type of connection than ball/chain.

A connection interface may comprise any means of connecting one element to another, or any structure configured to mate with or adhere to a separate structure. For example, in some implementations a connection interface may be configured with a curved structure configured to mate with a corresponding curved structure of a connecting end of a strap, either directly or though one or more intermediary connectors or structures. Intermediary connectors may comprise any structure which corresponds to the connecting structure(s) of a connection interface and connecting end of a strap. Such alternative connectors at either or both the connection interface or connecting end of a strap may include snaps, clips, clamps, mating structures, screw/thread structures, hook and loop fasteners, magnets, adhesives, or the like.

In some implementations, first connecting end 151 and second connecting end 152 of strap 150 may be of any of the types described herein. In some implementations, first connecting end 151 and second connecting end 152 may be of other fastening or securing types, such as buttons, hooks, loops, snaps, magnets, adhesives, or the like. In some implementations, first connecting end 151 and second connecting end 152 are of the same type or style. In some implementations, first connecting end 151 and second connecting end 152 may be of different type or style.

In some implementations, connecting points may be manufactured integrally with phone case, i.e., manufactured as a single structure. In other implementations, connecting points may be detachable or removable from the phone case.

In some implementations, shaft 111 may comprise a plurality of parts. In some implementations, shaft 111 may comprise a shaft first part, shaft second part, shaft third part, and so on. In some implementations, shoulder 112 may be affixed to shaft first part and connection interface 115 may be affixed to shaft second part. In some implementations, shaft first part may be configured to mate with, connect with, or affix to shaft second part.

In some implementations, shaft first part comprises a threaded screw structure, and shaft second part comprises a threaded structure configured to receive the screw structure of shaft first part. In such implementations, shaft 111 is fully assembled by inserting shaft first part into shaft second part and rotating until the corresponding threads of the elements lock. In such implementations, shoulder 112 and shaft first part may be passed from the interior of phone case 100 to the exterior of phone case 100 (i.e., shaft first part passes through the body of phone case 100 from the interior to the exterior, while shoulder 112 remains on the interior and engages the inner face of phone case 100). Shaft first part may then be inserted into shaft second part (which may be affixed to connection interface 115), and by rotating one or both of shaft first part and shaft second part, a user may cause the first and second parts to join and form shaft 111. Once joined, shaft 111 affixes connection interface 115 to phone case 100 as described above.

The features and elements described herein may be manufactured from any material. Features and elements thereof may be manufactured from plastic (such as high-density polyethylene, polyethylene, polycarbonate, polypropylene, polystyrene, polyurethane, acrylonitrile butadiene styrene, polylactic acid, or the like), rubber, silicone, metal (such as steel, aluminum, brass, gold, silver, or the like), leather, cloth, wood, composite material (such as fiberglass, carbon fiber, or the like), gemstones, or any combination of materials. Those skilled in the art may select other materials not listed here to optimize characteristics of the structures described herein, such as strength, durability, weight, scratch or dent resistance, aesthetic value, or other traits.

What is claimed is:

1. A mobile device carrying device, comprising:

a first connecting point configured to engage with a carrying case for a mobile device, the first connecting point having a first connection interface;

a second connecting point configured to engage with a carrying case for a mobile device, the second connecting point having a second connection interface;

a first intermediary connector configured to mate with the first connection interface of the first connecting point;

a second intermediary connector;

a strap; and a first connecting end and a second connecting end;

wherein the first connecting end comprises of a first connective head and a ball mount, wherein the ball mount of the first connecting end is configured to mate with the first intermediary connector; and wherein the second connecting end comprises of a second connective head and a ball mount, wherein the ball mount of the second connecting end is configured to mate with the second intermediary connector, wherein the first connective head and the second connective head are each configured to mate with the strap, wherein the first intermediary connector is configured to mate with the connection interface of the first connecting point, wherein the second intermediary connector is configured to mate with the connection interface of the second connecting point, wherein the first connective head and the second connective head each comprise a spherical or ovaloid structure located opposite their respective ball mounts, and wherein the spherical or ovaloid structure comprising an opening, whereby a portion of the strap passes through the hole thereby connecting the strap to the corresponding first connecting head and second connecting head.

2. The mobile device carrying device of claim 1, wherein the first intermediary connector and the second intermediary connector each comprise a ball chain connector.

3. The mobile device carrying device of claim 1, wherein the first connecting point comprises a shaft configured to pass through the mobile device case, a shoulder configured to engage the mobile device case at a first end of the shaft, and the first connection interface at a second end of the shaft.

4. The mobile device carrying device of claim 3, wherein the shaft comprises a threaded screw at the second end of the shaft, the first connection interface comprises a threaded hole configured to mate with the threaded screw at the second end of the shaft, and the first connection interface is mated to the shaft by the mating of the threaded screw and threaded hole.

5. The mobile device carrying device of claim 3, wherein the first connection interface is mated to the shaft by use of a die press.

6. The mobile device carrying device of claim 1, wherein the second intermediary connector is configured to mate with the second connection interface of the second connecting point;

wherein the second connecting point comprises a shaft configured to pass through the mobile device case, a shoulder configured to engage the mobile device case at a first end of the shaft, and the second connection interface at a second end of the shaft.

7. The mobile device carrying device of claim 6, wherein the shaft comprises a threaded screw at the second end of the shaft, the second connection interface comprises a threaded hole configured to mate with the threaded screw at the second end of the shaft, and the second connection interface is mated to the shaft by the mating of the threaded screw and threaded hole.

8. The mobile device carrying device of claim 6, wherein the second connection interface is mated to the shaft by use of a die press.

* * * * *